(12) United States Patent
Ko et al.

(10) Patent No.: US 10,797,368 B2
(45) Date of Patent: Oct. 6, 2020

(54) METAL AIR BATTERY SYSTEM

(71) Applicant: Samsung Electronics Co., Ltd., Suwon-si, Gyeonggi-do (KR)

(72) Inventors: Jeongsik Ko, Hanam-si (KR); Hyukjae Kwon, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 80 days.

(21) Appl. No.: 15/987,058

(22) Filed: May 23, 2018

(65) Prior Publication Data

US 2019/0190103 A1    Jun. 20, 2019

(30) Foreign Application Priority Data

Dec. 14, 2017 (KR) .................. 10-2017-0172646

(51) Int. Cl.
*H01M 12/02* (2006.01)
*H01M 12/08* (2006.01)
*H01M 12/06* (2006.01)

(52) U.S. Cl.
CPC .......... *H01M 12/02* (2013.01); *H01M 12/06* (2013.01); *H01M 12/08* (2013.01)

(58) Field of Classification Search
CPC .............................. H01M 12/02; H01M 12/08
USPC .................................................... 429/405
See application file for complete search history.

(56) References Cited

U.S. PATENT DOCUMENTS 4,971,609 A * 11/1990 Pawlos .............. B01D 53/0446
                                                          96/128
2016/0032268 A1    2/2016 Grovender et al.
2016/0036109 A1    2/2016 Kim et al.
(Continued)

FOREIGN PATENT DOCUMENTS

KR         101470170 B1    12/2014
KR     1020160015853 A      2/2016
(Continued)

OTHER PUBLICATIONS

Kuphaldt, Tony R., What is a 4-way Solenoid Valve?, May 17, 2017, Instrumentation Tools, pp. 1-3 (Year: 2017).*
(Continued)

*Primary Examiner* — Jonathan Crepeau
(74) *Attorney, Agent, or Firm* — Cantor Colburn LLP (57) ABSTRACT

A metal air battery system includes: a battery cell module configured to generate electricity by oxidation of a metal and reduction of oxygen; a plurality of air purification modules in fluid communication with the battery cell module; a compressed air supply unit configured to supply compressed air to the plurality of air purification modules; and a buffer tank disposed between the compressed air supply unit and the plurality of air purification modules, and configured to receive compressed air from the compressed air supply unit and to supply the compressed air to the plurality of air purification modules, wherein a bottom portion of the buffer tank includes a plurality of holes, and a hole of the plurality of holes corresponds to an inlet of an air purification module in the plurality of air purification modules, and the hole is directly connected to the corresponding inlet of the air purification module.

14 Claims, 6 Drawing Sheets

(56) References Cited

U.S. PATENT DOCUMENTS

2016/0064786 A1* 3/2016 Ko ..................... H01M 12/08
429/407

FOREIGN PATENT DOCUMENTS

| KR | 101618161 B1 | 4/2016 |
| KR | 1020160129610 A | 11/2016 |

OTHER PUBLICATIONS

Moon Min Seok, Kim Mee Jeong, Kang Sin Gae, Jeonju Machinery Res Ct, KR101618161B1, Metal Air Cell Unit, Google Patents, Machine Translation, May 4, 2016 (Year: 2016).*

* cited by examiner

METAL AIR BATTERY SYSTEM

CROSS-REFERENCE TO RELATED APPLICATION

This application claims priority to and the benefit of Korean Patent Application No. 10-2017-0172646, filed on Dec. 14, 2017, in the Korean Intellectual Property Office, and all the benefits accruing therefrom under 35 U.S.C. § 119, the content of which is incorporated herein by reference in its entirety.

BACKGROUND

1. Field

The present disclosure relates to a metal air battery system including a buffer tank that uniformly supplies compressed air to a metal air battery and a plurality of air purification modules.

2. Description of the Related Art

A metal air battery includes a plurality of metal air cells, and each of the metal air cells includes an anode that is able to absorb and discharge ions and a cathode that uses oxygen in the air as an active material. In the cathode, a reduction and oxidation of oxygen entering the metal air battery from the outside occurs in the cathode, and, in the anode, an oxidation and reduction of a metal occurs. The metal air battery generates electrical energy by converting the chemical energy generated in the reactions. For example, the metal air battery absorbs oxygen when the metal air battery is discharged, and the metal air battery discharges oxygen when the metal air battery is charged. In this way, since the metal air battery uses oxygen present in the air, the energy density of the metal air battery may be increased. For example, the metal air battery may have an energy density that is a several times greater than that of an existing standard lithium ion battery.

When a metal air battery is operated, oxygen is supplied to the cathode and oxygen molecules are used as an active material. Impurities, such as $H_2O$ and $CO_2$ present in the air may interrupt the generation of a metal peroxide (for example, $Li_2O_2$), and thus, the capacity and lifetime of the metal air battery may be reduced.

In order to supply purified air to the metal air battery, an air purification module, such as a filter, an absorbent or pressure swing adsorption (PSA) is used, and air is supplied to the air purification module by using a blower or a compressor. When a large amount of air is supplied to the air purification module by using a compressor, etc. air pressure and air flow rate may vary according to the operating characteristics of the compressor, and this affects the performance of the metal air battery. Thus, it would be desirable to develop an appropriate system for preventing the variation in the performance of the metal air battery.

SUMMARY

Provided is a metal air battery system including a buffer tank that uniformly supplies compressed air to a plurality of relatively small air purification modules.

Additional aspects will be set forth in part in the description which follows and, in part, will be apparent from the description, or may be learned by practice of the presented embodiments.

According to an aspect of an embodiment, a metal air battery system includes: a battery cell module configured to generate electricity by oxidation of a metal and reduction of oxygen; a plurality of air purification modules in fluid communication with the battery cell module; a compressed air supply unit configured to supply compressed air to the plurality of air purification modules; and a buffer tank arranged between the compressed air supply unit and the plurality of air purification modules, and configured to receive compressed air from the compressed air supply unit and to supply it to the plurality of air purification modules, wherein a bottom portion of the buffer tank comprises a plurality of holes, and a hole of the plurality of holes corresponds to an inlet of the an air purification module of the plurality of air purification modules, and the hole is directly connected to the corresponding inlet of the air purification module.

The plurality of holes may be disposed in a concentric circle with substantially the same distance between adjacent holes.

The plurality of air purification modules may include 4 to 6 air purification modules.

Each air purification module of the plurality of air purification modules may include a first adsorption tower and a second adsorption tower, wherein the first adsorption tower is configured to purify air, to supply the purified air to the battery cell module, and to regenerate the second adsorption, and wherein the second adsorption tower is regenerated by receiving a portion of the purified air that has passed through the first adsorption tower to the second adsorption tower and/or by receiving air discharged from the battery cell module.

The first adsorption tower and the second adsorption tower may be directly in fluid communication with each other, and may be indirectly in fluid communication with each other through the battery cell module.

The plurality of air purification modules may be configured to be operated by a pressure swing adsorption (PSA) method, a temperature swing adsorption (TSA) method, a pressure temperature swing adsorption (PTSA) method, a vacuum swing adsorption (VSA) method, a selectively separating method, or a combination of at least two of the foregoing methods.

The metal air battery system may further include: a first tube, which connects an inlet of the first adsorption tower and an inlet of the second adsorption tower; a second tube, which directly connects the first tube to a corresponding hole of the buffer tank; and a third tube and a fourth tube, each of which is configured to discharge waste air which flows in a reverse direction from the first adsorption tower to the outside and the fourth tube is configured to discharge waste air which flows in a reverse direction from the second adsorption tower to the outside.

The metal air battery system may further include an extension unit on the bottom portion of the buffer tank, the extension unit surrounding the plurality of holes and defining a first space, wherein the inlet surfaces of the first and second adsorption towers are tightly combined with the extension unit to contact a lower side of the extension unit, and the third and fourth tubes are exposed in the first space.

The extension unit may include a discharge outlet through which the waste air discharged from the third tube and the fourth tube is discharged to the outside.

The metal air battery system may further include a dispersion plate facing the inlet of the buffer tank and configured to uniformly disperse compressed air supplied from the compressed air supply unit.

The metal air battery system may further include a plurality of through holes in the dispersion plate.

The first adsorption tower and the second adsorption tower may each include an adsorbent, and the adsorbent may include a zeolite, an alumina, a silica gel, metal-organic framework (MOF), a zeolitic imidazolate framework (ZIF), an activated carbon, or a combination of at least two of the foregoing materials.

The metal air battery system may further include: an inlet manifold configured to receive oxygen-rich air which has passed through the plurality of air purification modules and to supply the oxygen-rich air to a plurality of air channels in the battery cell module; and an outlet manifold configured to collect waste air which has passed through the plurality of air channels, wherein a plurality of tubes configured to supply the waste air to the first adsorption tower and the second adsorption tower of the plurality of air purification modules, are connected to the outlet manifold.

The battery cell module may include a lithium air battery.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Hereinafter, embodiments will be described in detail with reference to the accompanying drawings. In the drawings, thicknesses of layers or regions may be exaggerated for clarity of the specification. The embodiments of the inventive concept are capable of various modifications and may be embodied in many different forms.

It will be understood that when an element or layer is referred to as being "on" or "above" another element or layer, the element or layer may be directly on another element or layer or intervening elements or layers. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Figure 1:
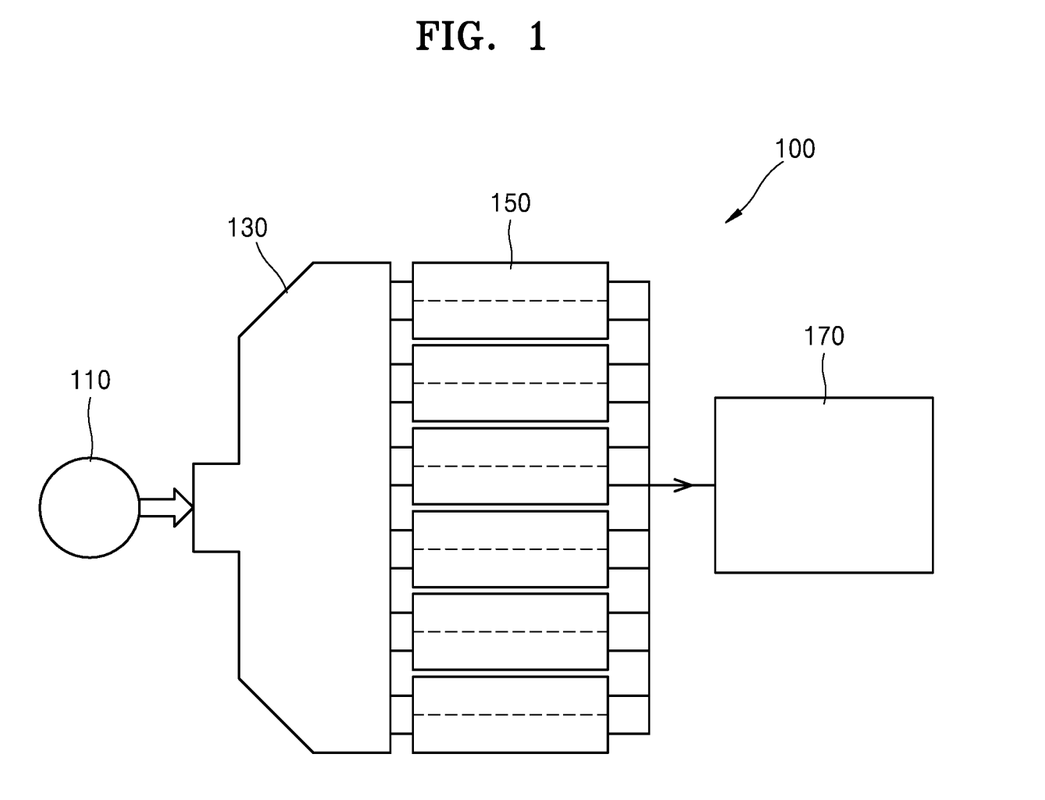
FIG. 1 is a schematic diagram showing a configuration of a metal air battery system, according to an exemplary embodiment.

FIG. 1 is a schematic diagram showing a configuration of a metal air battery system 100 according to an exemplary embodiment.

Referring to FIG. 1, the metal air battery system 100 includes a compressed air supply unit 110, a buffer tank 130, a plurality of air purification modules 150, and a battery cell module 170.

The compressed air supply unit 110 is configured to supply compressed air having a predetermined pressure, for example, a pressure of approximately 2 bar, to the buffer tank 130. A compressor that generates a high pressure, for example, 7 bar may be used as the compressed air supply unit 110. However, a compressor that generates a high pressure has a relatively large size, and thus, may increase a volume of the metal air battery system 100. An apparatus that is small and supplies a large amount of air may be used as the compressed air supply unit 110. A blower that generates compressed air having a pressure of approximately 2 bar may be used as the compressed air supply unit 110.

The metal air battery system 100 may include a plurality of air purification modules 150. For example, the metal air battery system 100 may include 4 to 6 air purification modules 150. In FIG. 1, as an example, it is depicted that 6 air purification modules 150 are included in the metal air battery system 100. During operation of the metal air battery system 100, approximately 3 to 4 air purification modules 150 may be in use, and the remaining air purification modules 150 may be used to replace the air purification modules 150 whose performance is reduced. The air purification modules 150 may remove impurities, such as moisture, carbon dioxide, and nitrogen in the compressed air that enter from the buffer tank 130.

The metal air battery system 100 according to an exemplary embodiment includes a plurality of relatively small and short air purification modules 150 instead of using a single long air purification module, and thus, a relatively low pressure air may be used. Thus, a blower that generates compressed air having a pressure of approximately 2 bar may be used as the compressed air supply unit 110. Accordingly, the volume of the metal air battery system 100 according to an exemplary embodiment may be reduced.

The buffer tank 130 receives compressed air, and supplies the compressed air to the air purification modules 150. The buffer tank 130 is an air storage unit, and is configured to uniformly supply compressed air received from the compressed air supply unit 110 to the air purification modules 150. The buffer tank 130 may be in fluid communication with the air purification modules 150.

The battery cell module 170 generates electricity by the oxidation of metal and the reduction of oxygen. For example, if the metal is lithium, the metal air battery generates electricity through a chemical reaction in which $Li_2O_2$ is generated by a reaction between Li and oxygen as shown in Reaction 1 below.

$$Li + \tfrac{1}{2} O_2 \rightarrow \tfrac{1}{2} Li_2 O_2 \qquad \text{Reaction 1}$$

However, when moisture is present in the air, the energy density and lifetime of the battery cell module 170 is reduced due to a reaction that generates LiOH as shown in Reaction 2 below.

$$4Li + 6H_2O + O_2 \rightarrow 4(LiOH \cdot H_2O) \qquad \text{Reaction 2}$$

The air purification modules 150 remove moisture in the compressed air that is supplied thereto. The air purification modules 150 fluidly communicate with the battery cell module 170.

Figure 2:
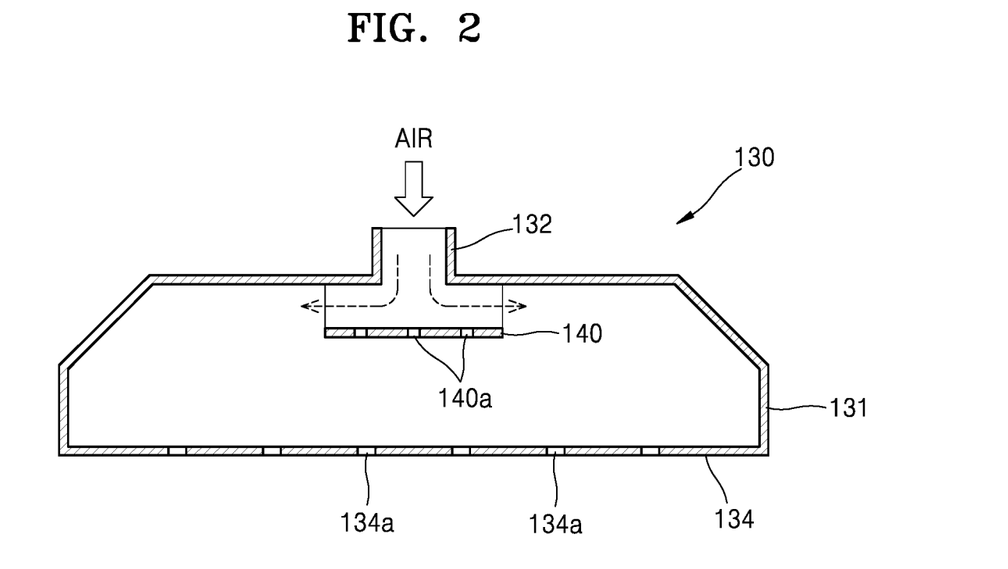
FIG. 2 is a schematic cross-sectional view showing a structure of a buffer tank of a metal air battery system, according to an exemplary embodiment.

FIG. 2 is a schematic cross-sectional view of a structure of the buffer tank 130 of a metal air battery system 100, according to an exemplary embodiment.

Figure 3:
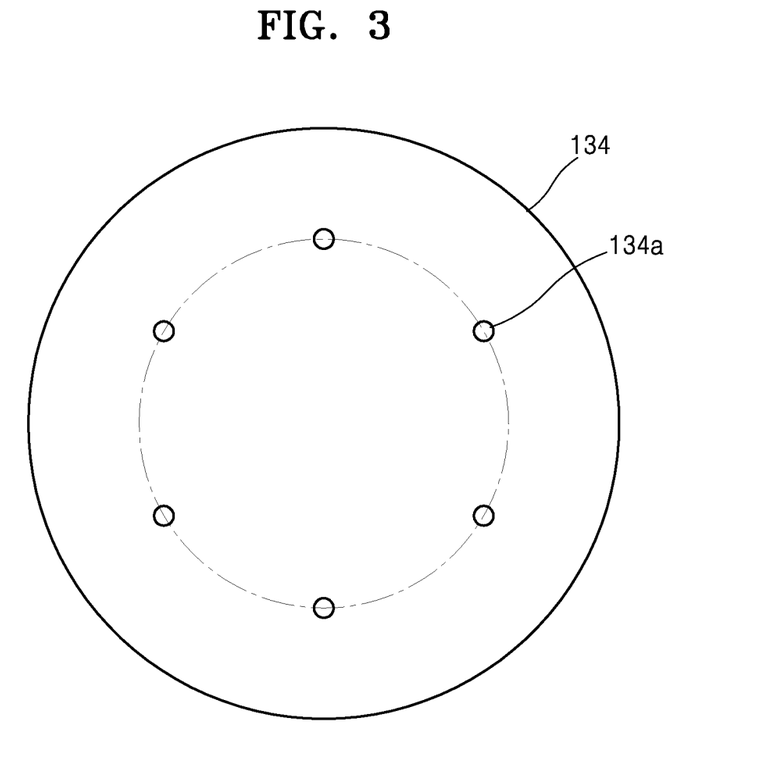
FIG. 3 is a plan view of a structure of a buffer tank of a metal air battery system, according to an exemplary embodiment.

Referring to FIG. 2, the buffer tank includes a plurality of holes 134a that supply compressed air to the air purification modules 150. The plurality of holes 134a are formed in a bottom portion 134 of the buffer tank facing an inlet 132 that is connected to the compressed air supply unit 110. The holes 134a, as depicted in FIG. 3, may be disposed in a concentric circle in the bottom portion 134, with substantially a same distance between adjacent holes. In FIG. 3, six holes 134a are depicted as an example, but the present exemplary embodiment is not limited thereto. In FIG. 3, the bottom portion 134 having a concentric circle shape is depicted, but the present exemplary embodiment is not limited thereto. For example, the bottom portion 134 of the buffer tank 130 may have a rectangular shape.

A dispersion plate 140 that distributes compressed air may be included in the buffer tank 130. The dispersion plate 140 is configured to prevent compressed air entering the buffer tank 130 from the compressed air supply unit 110, from directly being supplied to the holes 134a of the bottom portion 134. The dispersion plate 140 may face the inlet 132 and may be spaced apart from the inlet 132 at a predetermined distance. The dispersion plate 140 may include a plurality of through holes 140a.

An edge of the distribution plate 140 is fixedly installed within the buffer tank 130. The dispersion plate 140 may be fixed in place in various ways known to those of skill in the art, and accordingly, a detailed description thereof will be omitted. Most of the compressed air supplied from the compressed air supply unit 110 which contacts the dispersion plate 140, is distributed to the sides 131 of the dispersion plate 140, and is uniformly dispersed in the buffer tank 130. Accordingly, the compressed air may be uniformly dispersed and supplied to the holes 134a disposed in the bottom portion 134 of the buffer tank. When the dispersion plate 140 having the through holes 140a is used, some of the compressed air may pass through the through holes 140a formed in the dispersion plate 140, and the remaining compressed air may be dispersed in the buffer tank 130 through a space present between the inlet 132 and the dispersion plate 140. The through holes 140a may reduce a pressure applied to the dispersion plate 140.

The dispersion plate 140 prevents the compressed air that enters from the inlet 132 from directly contacting the bottom portion 134. The dispersion plate 140 may have a size extending across (e.g., covering) the entire inlet 132 when the dispersion plate 140 is viewed from the inlet 132. However, the present exemplary embodiment is not limited thereto. The dispersion plate 140 may divide an internal space of the buffer tank 130 into two spaces by being extended from and connected to a body of the buffer tank 130.

Figure 4:
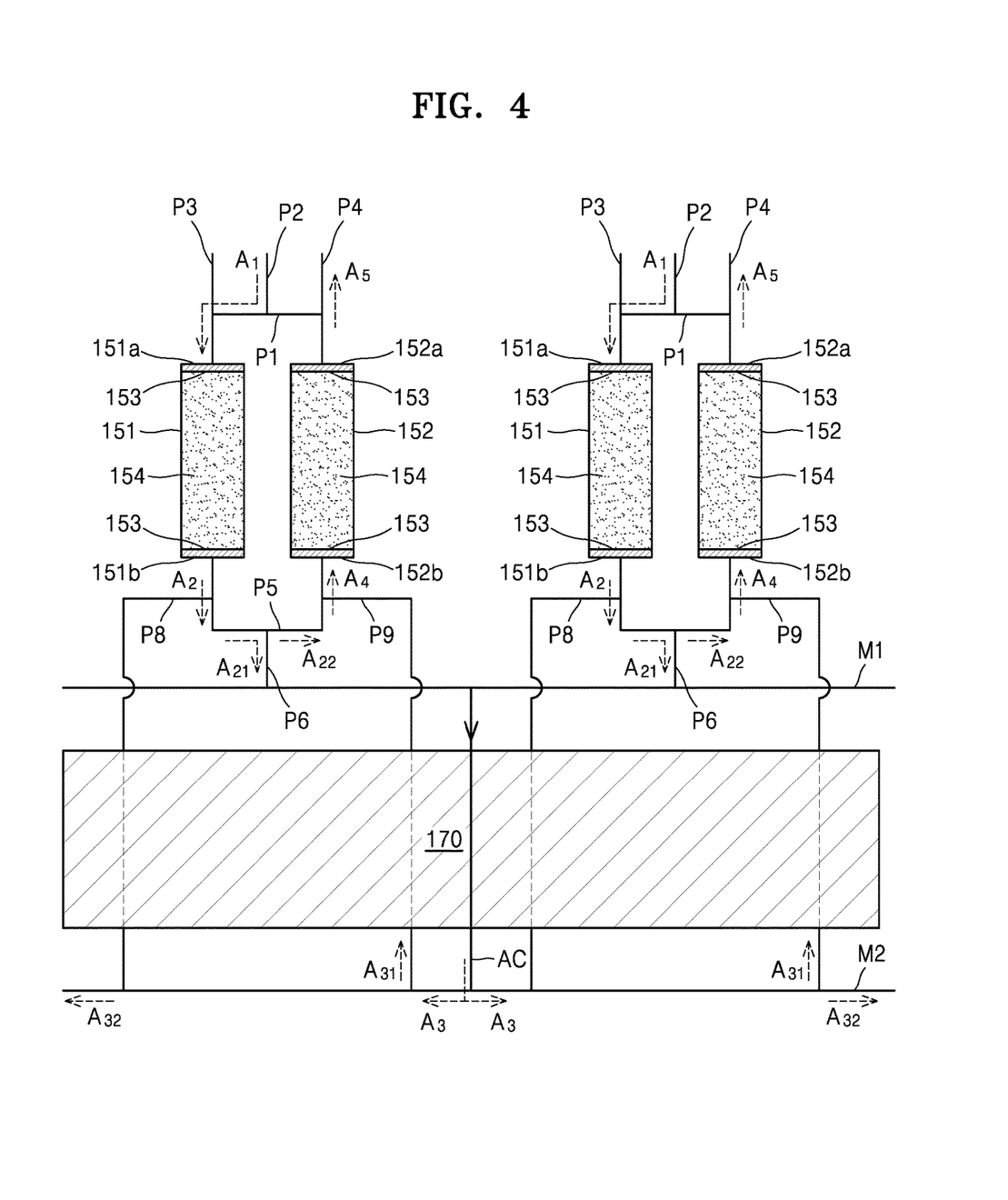
FIG. 4 is a schematic diagram showing a configuration of an air purification module of a metal air battery system, according to an exemplary embodiment.

FIG. 4 is a schematic diagram showing a configuration of the air purification modules 150 of the metal air battery system 100, according to an exemplary embodiment. In FIG. 4, for convenience, only two air purification modules 150 are depicted.

Referring to FIG. 4, the air purification modules 150 may include a first adsorption tower 151 and a second adsorption tower 152. A first tube P1 may be connected to inlet surfaces 151a and 152a of the first adsorption tower 151 and the second adsorption tower 152, respectively. The first tube P1 and a hole 134a of the buffer tank 130 corresponding to the first tube P1, may be directly connected to one another via a second tube P2. A third tube P3 that exhausts waste air that flows in a reverse direction in the first adsorption tower 151 and a fourth tube P4 that exhausts waste air that flows in a reverse direction in the second adsorption tower 152, may be connected to the first tube P1. The waste air will be described below.

The air purification modules 150 purify air A1 by removing impurities, such as moisture, carbon dioxide, and nitrogen in the air A1, and generate oxygen-rich air A2. The content of oxygen in the oxygen-rich air A2 may be in a range from about 40 volume percent (vol %) to about 60 vol %. The oxygen-rich air A2 is supplied to the battery cell module 170.

A fifth tube P5 may be connected to discharge sides 151b and 152b of the first adsorption tower 151 and the second adsorption tower 152, respectively. The oxygen-rich air A2 flowing from the first adsorption tower 151 and the second adsorption tower 152 is supplied to the fifth tube P5. A sixth tube P6 is connected to the fifth tube P5, and the sixth tube P6 is also connected to an inlet manifold M1 of the battery cell module 170. Only a portion of air A21 of the oxygen-rich air A2 purified in the first adsorption tower 151 is supplied to the battery cell module 170, and the remaining portion of air A22 of the oxygen-rich air A2 may be directly supplied to the second adsorption tower 152 without passing through the battery cell module 170. Oxygen in the portion of air A21 of the oxygen-rich air A2 purified in the first adsorption tower 151 may be used as a cathode active material. An amount of the portion of air A21 may be in a range from about 50 vol % to about 100 vol % of the total amount of the oxygen-rich air A2, and an amount of the remaining portion of air A22 may be in a range from about 0 vol % to about 50 vol % of total amount of the oxygen-rich air A2.

The remaining portion of air A22 supplied to the second adsorption tower 152 may flow in a reverse direction through the second adsorption tower 152, i.e., a direction opposite to the direction of air A1 flow through the first adsorption tower, and thus may purge any impurities adsorbed in the second adsorption tower 152, and accordingly, the second adsorption tower 152 may be regenerated. As used herein, the term "regeneration" denotes the restoration of the ability of the air purification module(s) to purify air by detaching or discharging impurities adsorbed or captured by the air purification module(s).

As another example, all (i.e., 100%) of the portion of air A21 of the oxygen-rich air A2 purified in the first adsorption tower 151 may be supplied to the battery cell module 170. In this case, the amount of the oxygen-rich air A2 is equal to that of of the portion of air 21, and the amount of the remaining portion of air A22 is zero.

The oxygen-rich air A2 enters a plurality of air channels AC formed in the battery cell module 170 through the inlet manifold M1 and is supplied to a cathode, and afterwards, is discharged from the battery cell module 170 through an outlet manifold M2. An eighth tube P8 and a ninth tube P9, which supply a portion of waste air retrieved from the battery cell module 170, may be connected to the outlet manifold M2.

Waste air A3 discharged from the air channels AC of the battery cell module 170 is supplied to the outlet manifold M2. A portion of waste air A31 of the waste air A3 in the outlet manifold M2 is supplied to the second adsorption tower 152 through the ninth tube P9. Remaining waste air A32 is discharged to the outside.

The portion of waste air A31 of waste air A3 discharged from the battery cell module 170 may mix with at least the remaining portion of air A22 of the oxygen-rich air A2, described above, through the ninth tube P9, and may form air A4. Afterwards, the air A4 is supplied to the second adsorption tower 152 and is used for the regeneration of the second adsorption tower 152 then discharged as discharge air A5.

The amount of the portion of waste air A31 may be in a range from about 60 vol % to about 100 vol % of the total amount of the waste air A3. The temperature of the portion of waste air A31 is high because the portion of waste air A31 is discharged from the battery cell module 170. For example, the temperature of the portion of waster air A41 may be in a range from 40° C. to 100° C., and thus, the portion of waste air A31 may increase the regeneration efficiency of the second adsorption tower 152.

The first adsorption tower 151 and the second adsorption tower 152 may have an approximately cylindrical shape. For example, the first adsorption tower 151 and the second adsorption tower 152 may be formed of an aluminum pipe. A membrane 153 that selectively blocks transmission of moisture is present on the inlets and the outlets of the first adsorption tower 151 and the second adsorption tower 152, and an adsorbent 154 that selectively adsorbs impurities, such as carbon dioxide and nitrogen, may be charged in the membrane 153. The membrane 153 may be a polyimide film.

The adsorbent 154 may selectively adsorb impurities present in the air A1. The adsorbent 154 may include a zeolite, an alumina, a silica gel, a metal-organic framework (MOF), a zeolitic imidazolate framework (ZIF), an activated carbon, or a combination of at least two of the foregoing materials. The terminology "MOF" denotes a crystalline compound including metal ions or metal clusters coordinated to organic molecules to form one-, two-, or three-dimensional structures that are porous. Also, the terminology "ZIF" denotes a nano-porous compound including tetrahedral clusters of MN4 (where M is a metal) linked by imidazolate ligand.

The first adsorption tower 151 and the second adsorption tower 152 may alternately perform, one by one, a function of supplying oxygen-rich air A2 to the battery cell module 170 after purifying the air A1 and a function of regenerating corresponding adsorption tower using at least a portion of the waste air A31 of the waste air A3 received from the battery cell module 170.

As depicted in FIG. 4, as a first half cycle, the first adsorption tower 151 may perform a function of supplying oxygen-rich air A2 to the battery cell module 170 after purifying the air A1, and the second adsorption tower 152 may perform a function of regenerating the second adsorption tower 152 by using at least a portion of the waste air A31 of the waste air A3 discharged from the battery cell module 170.

As a second half of the cycle, although not shown, the second adsorption tower 152 may perform a function of supplying oxygen-rich air to the battery cell module 170 after purifying air, and the first adsorption tower 151 may perform a function of regenerating the first adsorption tower 151 by receiving at least a portion of the waste air discharged from the battery cell module 170 through the eighth tube P8.

The first half cycle and the second half cycle may be alternately repeated with a certain duration (for example, 30 seconds).

As depicted in FIG. 4, the first adsorption tower 151 and the second adsorption tower 152 may be directly in fluid communication with each other, and may be indirectly in fluid communication through the battery cell module 170.

The air purification modules 150 may be configured to be operated by a pressure swing adsorption (PSA) method, a temperature swing adsorption (TSA) method, a pressure temperature swing adsorption (PTSA) method, a vacuum swing adsorption (VSA) method, a selectively separating method, or a combination of at least two of the foregoing methods. In the present disclosure, the term "PSA" refers to a technique in which a gas is preferentially adsorbed onto, or captured by, an adsorbent at a relatively high partial pressure thereof and then the adsorbed or captured gas is released or discharged from the adsorbent when the partial pressure of the gas is reduced. In addition, the term "TSA" refers to a technique in which a gas is preferentially adsorbed onto or captured by an adsorbent at room temperature and then the adsorbed or captured gas is released or discharged from the adsorbent when the temperature is increased. The term "PTSA" refers to a combination of PSA and TSA, and the term "VSA" refers to a technique in which a gas is preferentially adsorbed onto or captured by an adsorbent at about atmospheric pressure and then the adsorbed or captured gas is released or discharged from the adsorbent under a vacuum.

In the metal air battery system 100 according to the present exemplary embodiment, the oxygen-rich air A2 purified in the air purification modules 150 (for example, the first adsorption tower 151) is supplied directly to the battery cell module 170, and thus, the efficiency of the metal air battery system 100 is high. Also, since the portion of waste air A31 used to regenerate the air purification modules 150 (for example, the second adsorption tower 152) is large, and the temperature of the air A31 is greater than room temperature (approximately 25° C.), the regeneration efficiency of the air purification modules 150 is high. Without being limited by theory, it is understood that the reason why the temperature of the portion of waster air A31 is higher than room temperature is because heat is generated when the battery cell module 170 is operated.

The battery cell module 170 may be a lithium air battery. However, the present exemplary embodiment is not limited thereto. The battery cell module 170 may be a sodium air battery, a zinc air battery, a potassium air battery, a calcium air battery, a magnesium air battery, an ion air battery, an aluminum air battery, or an alloy air battery including at least two of the above metals.

Figure 5:
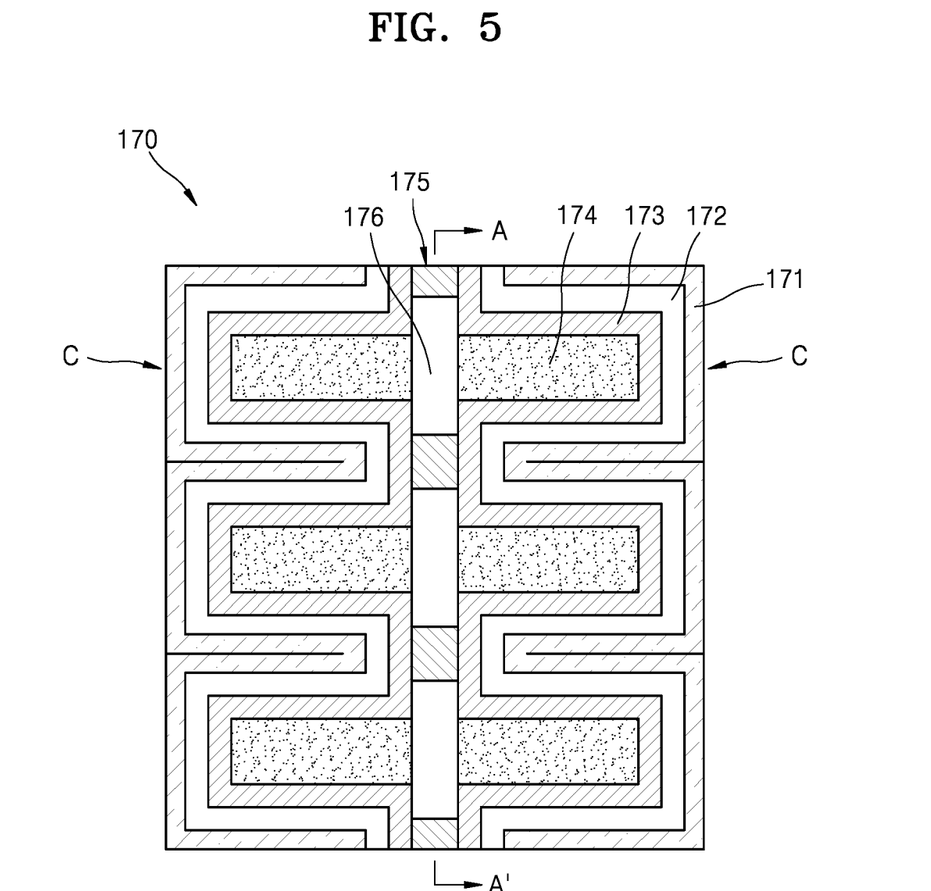
FIG. 5 is a cross-sectional view showing a structure of a battery cell module of a metal air battery system, according to an exemplary embodiment.

FIG. 5 is a cross-sectional view showing a structure of the battery cell module 170 of the metal air battery system according to an exemplary embodiment. The battery cell module 170 includes a plurality of cells C. For example, the battery cell module 170 may include approximately 100 to 150 cells C that are connected in a series. FIG. 5 shows a pair of the cells C.

Referring to FIG. 5, each of the cells C includes an anode 171 having a bent structure. The anode 171 includes a plurality of openings, and each opening is defined by three sides of the anode. In FIG. 5, as an example, the anode 171 having three openings is depicted. An anode protection layer 172 and a cathode 173 are sequentially formed along inner surfaces of the three openings of the anode 171. As a result, the cathode 173 includes a plurality of openings, each opening defined by three sides of the cathode. For example, in FIG. 5, the cathode forms three openings. Gas diffusion layers 174 are formed in the openings of the cathode.

An air channel layer 175 may be formed between the battery cells C facing each other. Air channels 176 that supply oxygen-rich air to the corresponding gas diffusion layer 174 may be present in the air channel layer 175. The gas diffusion layers 174 of a pair of the battery cells C are arranged to face each other, and the air channels 176 are formed therebetween.

Figure 6:
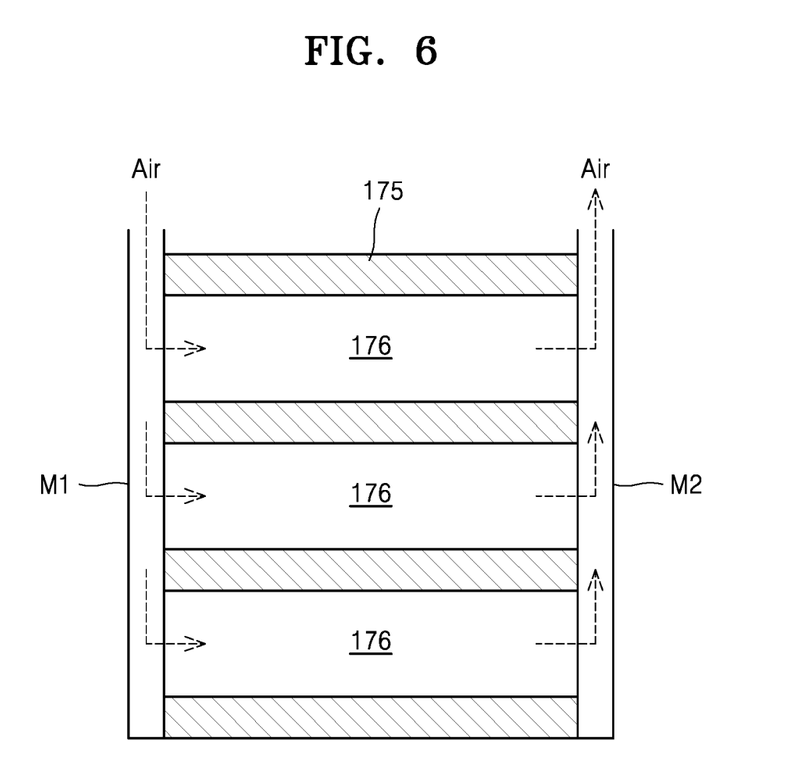
FIG. 6 is a cross-sectional view taken along line A-A' of FIG. 5.

FIG. 6 is a cross-sectional view of a structure of the air channel layer 175. FIG. 6 is a cross-sectional view taken along line A-A' of FIG. 5.

Referring to FIG. 6, oxygen-rich air received by the inlet manifold M1 is supplied to the three air channels 176. Regions (e.g. sides) of each of the air channels 176, except for a region connected to the gas diffusion layer 174, are blocked. Waste air that has passed through the air channels 176 is discharged to the outside through the outlet manifold M2. The inlet manifold M1 is connected to the sixth tubes P6 of FIG. 4, and the outlet manifold M2 has the same configuration as the outlet manifold M2 of FIG. 4.

The anode 171 performs a function of adsorption/discharge of metal ions. For example, the anode 171 may include Li, Na, Zn, K, Ca, Mg, Fe, Al, Cu, or an alloy thereof, and also, may include a stack including at least two layers of the metals described above.

The anode protection layer 172 may prevent transmission of oxygen and has conductivity with respect to metal ions. The anode protection layer 172 may include a polymer-based flexible electrolyte film. For example, the anode protection layer 172 may include a polymer non-woven fabric, such as a polypropylene-based non-woven fabric or a polyphenylene sulfide-based non-woven fabric, or a porous film of an olefin-based resin, such as polyethylene or polypropylene.

The anode protection layer 172 may include an electrolyte that transfers metal ions from the anode 171 to the cathode 173 and a solvent that dissolves the electrolyte. The electrolyte may be formed by dissolving a metal salt in the solvent and may be a solid phase electrolyte including a polymer-based electrolyte, an inorganic-based electrolyte, or a composite electrolyte of the polymer-based electrolyte and the inorganic-based electrolyte. For example, the metal salt may be a lithium salt including $LiN(SO_2CF_2CF_3)_2$, $LiN(SO_2C_2F_5)_2$, $LiClO_4$, $LiBF_4$, $LiPF_6$, $LiSbF_6$, $LiAsF_6$, $LiCF_3SO_3$, $LiN(SO_2CF_3)_2$, $LiC(SO_2CF_3)_3$, $LiN(SO_3CF_3)_2$, $LiC_4F_9SO_3$, $LiAlCl_4$, LiTFSI(lithium bis(trifluoromethane-sulfonyl)imide), or a combination thereof, and may further include an additional metal salt, such as $AlCl_3$, $MgCl_2$, NaCl, KCl, NaBr, KBr, $CaCl_2$, or a combination thereof.

The solvent may be any material that dissolves the lithium salt and the metal salt.

The anode protection layer 172 may be a single layer and the electrolyte may be impregnated in pores thereof. For example, an electrolyte formed by mixing polyethylene oxide (PEO) and LiTFSI may be impregnated in the pores of the anode protection layer 172.

The cathode 173 may include an electrolyte for transferring metal ions, a catalyst for oxidation/reduction of oxygen, a conductive material, and a binder. The electrolyte may be the same as the electrolyte used in the anode protection layer 172. A cathode slurry may be formed by mixing the electrolyte, the catalyst, the conductive material, and the binder, and adding a solvent to the mixture. Next, a cathode material layer may be formed by coating and drying the cathode slurry on the anode protection layer 172. The cathode 173 may subsequently be formed by patterning a surface of the cathode material layer.

The conductive material may be porous and may include, for example, a porous carbon material, a porous conductive metal material, or a porous conductive organic material, or a combination thereof. For example, the porous carbon material may be a carbon-based material including carbon black, graphite, graphene, activated carbon, carbon fibers, carbon nanotubes, or a combination thereof. The conductive metal material may be used as, for example, a metal powder type.

The catalyst may include Pt, Au, Ag, an oxide of Mn, Ni, and/or Co, or a combination thereof.

The binder may include polytetrafluoroethylene (PTFE), polypropylene, polyvinylidene fluoride (PVDF), polyethylene, and styrene-butadiene rubber (SBR).

The gas diffusion layer 174 is configured to uniformly supply purified air to the cathode 173.

The gas diffusion layer 174 may include a ceramic, a polymer, or a carbon material having a porous structure, or a combination of at least two of the foregoing materials. Since the gas diffusion layer 174 has a porous structure, the gas diffusion layer 174 may smoothly diffuse by absorbing the oxygen-rich air A2 discharged from the air purification modules 150.

The porous ceramic may include a magnesium-aluminum silicate.

The porous polymer may include a porous polyethylene, a porous polypropylene, or a combination thereof.

The porous carbon material may include carbon paper, carbon cloth, or carbon felt including carbon fibers. Since the gas diffusion layer 174 has a porous structure, the gas diffusion layer 174 absorbs air discharged from the air purification modules 150 and supplies air to the cathode 173.

A metal air battery system according to the present exemplary embodiment includes a plurality of air purification modules having a relatively small volume, and thus, a low pressure and small compressed-air supplying unit may be used in the metal air battery system. Accordingly, a small-sized metal air battery system may be realized. Also, compressed air is uniformly distributed to the air purification modules by using a buffer tank, and accordingly, the performance of the metal air battery system may be increased.

Figure 7:
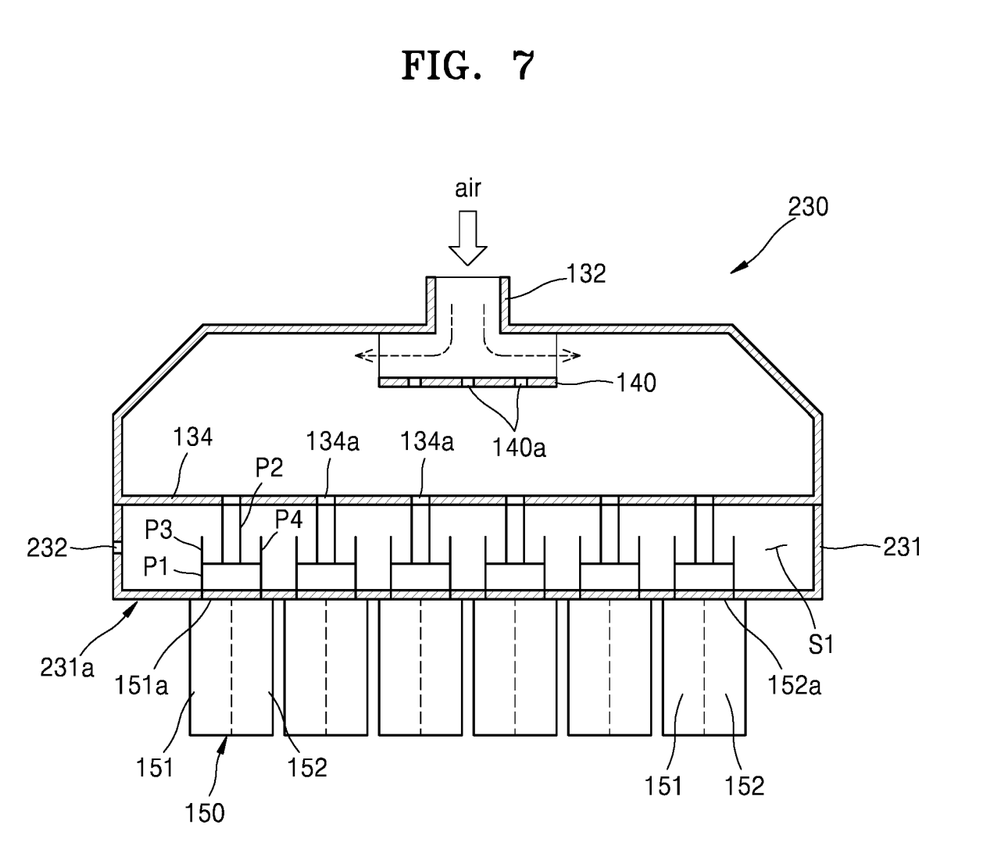
FIG. 7 is a cross-sectional view of a structure of a buffer tank of a metal air battery system, according to another exemplary embodiment.

FIG. 7 is a cross-sectional view showing a structure of a buffer tank 230 of a metal air battery system, according to another exemplary embodiment. Like reference numerals are used for elements that are substantially identical to the elements in FIG. 2, and the detailed descriptions thereof will not be repeated.

The buffer tank 230 extends to surround the holes 134a formed in the bottom portion 134 and includes an extension unit 231 that includes a first space S1. The inlet surfaces 151a and 152a of the air purification modules 150 may be attached to a lower side 231a of the extension unit 231. The buffer tank 230 may include the second tubes P2 directly connected to the holes 134a and the first tubes P1, the third tubes P3, and the fourth tubes P4 may be exposed within the first space S1. The first tubes P1 may penetrate through the lower side 231a of the extension unit 231. One or more discharge outlet 232 through which waste air discharged from the third and fourth tubes P3 and P4 is discharged to the outside may be formed in a side of the extension unit 231.

A metal air battery system including the buffer tank 230 according to the present exemplary embodiment has a compact structure since the buffer tank 230 and air purification modules 150 are combined with each other, and thus, the energy density of the metal air battery system may be increased.

While one or more embodiments have been described with reference to the figures, it will be understood by those of ordinary skill in the art that various changes in form and details may be made therein without departing from the spirit and scope as defined by the following claims.

What is claimed is:

1. A metal air battery system comprising:
   a battery cell module configured to generate electricity by oxidation of a metal and reduction of oxygen;
   a plurality of air purification modules in fluid communication with the battery cell module;
   a compressed air supply unit configured to supply compressed air to the plurality of air purification modules; and
   a buffer tank disposed between the compressed air supply unit and the plurality of air purification modules, and configured to receive compressed air from the compressed air supply unit and to supply the compressed air to the plurality of air purification modules such that each air purification module is concurrently in direct fluid communication with the compressed air supply unit,
   wherein a bottom portion of the buffer tank comprises a plurality of holes, and a hole of the plurality of holes corresponds to an inlet of an air purification module in the plurality of air purification modules, and the hole is directly connected to the corresponding inlet of the air purification module.

2. The metal air battery system of claim 1, wherein the plurality of holes are disposed in a concentric circle with substantially a same distance between adjacent holes.

3. The metal air battery system of claim 1, wherein the plurality of air purification modules comprises 4 to 6 air purification modules.

4. The metal air battery system of claim 1, wherein each air purification module of the plurality of air purification modules comprises a first adsorption tower and a second adsorption tower,
- wherein the first adsorption tower and the second adsorption tower are each configured to alternately purify air and supply the purified air to the battery cell module and to regenerate the other one of the first adsorption tower and the second adsorption tower,
- wherein the regeneration comprises receiving a portion of the purified air that has passed through the first adsorption tower or the second adsorption tower and/or receiving a portion of air discharged from the battery cell module.

5. The metal air battery system of claim 4, wherein the first adsorption tower and the second adsorption tower are directly in fluid communication with each other, and are indirectly in fluid communication with each other through the battery cell module.

6. The metal air battery system of claim 4, wherein the plurality of air purification modules are configured to be operated by a pressure swing adsorption method, a temperature swing adsorption method, a pressure temperature swing adsorption method, a vacuum swing adsorption method, a selectively separating method, or a combination of at least two of the foregoing methods.

7. The metal air battery system of claim 4, further comprising:
- a first tube, which connects an inlet of the first adsorption tower and an inlet of the second adsorption tower;
- a second tube, which directly connects the first tube to a corresponding hole of the buffer tank; and
- a third tube and a fourth tube, each of which is connected to the first tube, wherein the third tube is configured to discharge waste air which flows in a reverse direction from the first adsorption tower to the outside and the fourth tube is configured to discharge waste air which flows in a reverse direction from the second adsorption tower to the outside.

8. The metal air battery system of claim 7, further comprising an extension unit on the bottom portion of the buffer tank, the extension unit surrounding the plurality of holes and defining a first space,
- wherein the inlet of the first adsorption tower and the inlet of the second adsorption tower are tightly connected with the extension unit and contact a lower side of the extension unit, and the third and fourth tubes are exposed in the first space.

9. The metal air battery system of claim 8, wherein the extension unit comprises a discharge outlet through which the waste air discharged from the third tube and the fourth tube is discharged to the outside.

10. The metal air battery system of claim 7, further comprising a dispersion plate facing an inlet of the buffer tank and configured to uniformly disperse compressed air supplied from the compressed air supply unit.

11. The metal air battery system of claim 10, further comprising a plurality of through holes in the dispersion plate.

12. The metal air battery system of claim 7, wherein each of the first adsorption tower and the second adsorption tower comprises an adsorbent, and the adsorbent comprises a zeolite, an alumina, a silica gel, a metal-organic framework, a zeolitic imidazolate framework, an activated carbon, or a combination of at least two of the foregoing materials.

13. The metal air battery system of claim 7, further comprising:
- an inlet manifold configured to receive oxygen-rich air which has passed through the plurality of air purification modules and to supply the oxygen-rich air to a plurality of air channels in the battery cell module; and
- an outlet manifold configured to collect waste air which has passed through the plurality of air channels,
- wherein a plurality of tubes configured to supply the waste air to the first adsorption towers and the second adsorption towers of the plurality of air purification modules, are connected to the outlet manifold.

14. The metal air battery system of claim 1, wherein the battery cell module comprises a lithium air battery.

* * * * *